(12) United States Patent
Anders et al.

(10) Patent No.: US 6,203,834 B1
(45) Date of Patent: Mar. 20, 2001

(54) PROCESS FOR SMOKING FOOD ITEMS

(75) Inventors: Gary H. Anders, Lowell; Joseph F. Bott, Jr., Springdale, both of AR (US)

(73) Assignee: Tyson Foods, Inc., Springdale, AR (US)

( * ) Notice: Subject to any disclaimer, the term of this patent is extended or adjusted under 35 U.S.C. 154(b) by 0 days.

(21) Appl. No.: 09/511,591

(22) Filed: Feb. 23, 2000

Related U.S. Application Data

(62) Division of application No. 09/028,441, filed on Feb. 24, 1998, now Pat. No. 6,142,066.

(51) Int. Cl.[7] ............................................. A23B 4/044
(52) U.S. Cl. .......................... 426/314; 426/92; 426/289; 426/294; 426/312; 426/315
(58) Field of Search ................................. 426/314, 315, 426/92, 289, 294, 312

(56) References Cited

U.S. PATENT DOCUMENTS

| | | | |
|---|---|---|---|
| 1,280,772 | * 10/1918 | Legg ..................... | 426/315 |
| 2,116,223 | * 5/1938 | Stacey, Jr. ............. | 426/315 |
| 2,352,590 | * 6/1944 | Trinkle ................. | 426/315 X |
| 2,596,381 | * 5/1952 | Doty ..................... | 426/315 |
| 3,594,858 | 7/1971 | Simonsen ............... | 17/44.4 |
| 3,643,587 | 2/1972 | Harrington et al. ..... | 99/261 |
| 3,646,878 | 3/1972 | Keller ................... | 99/339 |
| 3,700,847 | 10/1972 | Rendek et al. ......... | 219/10.55 |
| 3,732,971 | 5/1973 | Simonsen .............. | 198/177 R |
| 3,747,513 | 7/1973 | Seelbach ............... | 99/476 |
| 3,792,508 | 2/1974 | Simonsen et al. ....... | 17/44.4 |
| 3,884,213 | 5/1975 | Smith ................... | 126/21 |
| 3,903,788 | 9/1975 | Freeland et al. ........ | 99/475 |
| 4,136,608 | 1/1979 | Gladd et al. ........... | 99/476 |
| 4,148,925 | 4/1979 | Pettinato et al. ....... | 426/235 |
| 4,176,082 | 11/1979 | West ..................... | 252/359 |
| 4,309,938 | 1/1982 | Harmon ................. | 99/477 |
| 4,322,874 | 4/1982 | Buller-Colthurst ...... | 17/44.4 |
| 4,588,598 | 5/1986 | Griffith et al. ......... | 426/312 |
| 4,961,373 | 10/1990 | Milone .................. | 99/355 |
| 4,976,009 | 12/1990 | Gladd ................... | 452/198 |
| 5,006,355 | 4/1991 | Stuck et al. ............ | 426/243 |
| 5,052,975 | 10/1991 | Handel .................. | 452/187 |
| 5,255,596 | 10/1993 | Fessman ................ | 99/477 |
| 5,334,088 | 8/1994 | Le-Normand et al. .... | 452/193 |
| 5,354,230 | 10/1994 | McFarlane et al. ...... | 452/51 |
| 5,355,782 | 10/1994 | Blanchard .............. | 99/482 |
| 5,484,619 | 1/1996 | Yamaoka et al. ........ | 426/315 |
| 5,512,312 | 4/1996 | Forney et al. .......... | 426/523 |

* cited by examiner

*Primary Examiner*—Milton Cano
(74) *Attorney, Agent, or Firm*—Dennis D. Brown; Fellers, Snider, Blankenship, Bailey & Tippens

(57) ABSTRACT

An apparatus, and method for cooking and smoking food items and a smoked product produced by the inventive method. The inventive apparatus preferably comprises (a) an oven including a belt-type conveyor, for continuously conveying food items through the oven, and a circulation system for circulating a cooking medium in the oven such that the cooking medium contacts and cooks the food items and (b) a smoke generation and delivery system for delivering smoke to the circulating system such that the smoke contacts the food items along with the cooking medium. The inventive method preferably comprises the steps of (a) continuously conveying food items through an oven and (b) delivering smoke into the oven such that the smoke contacts the food items. The oven used in the inventive apparatus and inventive method is preferably an indirect-fired oven. The smoke most preferably contacts the food items in an impinging manner.

6 Claims, 3 Drawing Sheets

PROCESS FOR SMOKING FOOD ITEMS

This application is a divisional of U.S. application Ser. No. 09/028,441, filed on Feb. 24, 1998, now U.S. Pat. No. 6,142,066.

FIELD OF THE INVENTION

The present invention relates to processes and apparatuses for preparing smoked food items and to products produced by such apparatuses and methods. More particularly, but not by way of limitation, the present invention relates to processes and apparatuses for simultaneously cooking and smoking food items, and to smoked food products produced by such processes and apparatuses.

BACKGROUND OF THE INVENTION

Meats, poultry, and other food items have typically been smoked in smokehouse-type systems. Smokehouse systems commonly involve batch-type operations wherein food items are placed in cages, or on racks, which are then placed in a smoking chamber. In the smoking chamber, smoke circulates down the sides and then up through the center of the chamber. The smoking process typically involves (1) a heat-up cycle wherein moisture is removed from the surfaces of the food items in order to prepare the items for smoking, followed by (2) a smoking cycle.

Smokehouse operations have many shortcomings. For example, batch-type smoking operations for poultry items commonly require five to seven hours or more. In addition to being inefficient, these slow smoking processes can sometimes impart an extremely dark color and/or an overpowering smoke flavor to the food items. Smokehouses commonly also do not provide desirably uniform temperature and smoke profiles. The existence of hot spots and low smoke points within the smoking chamber can cause substantial variations in the nature and quality of the products produced.

Some smokehouse operations have been modified to include means for pushing the smoking racks/cages through the smoking chamber or through a series of chambers wherein different phases of the smoking process are conducted. U.S. Pat. No. 4,976,009 discloses a smokehouse assembly including a sequence of processing chambers and a trolley assembly for carrying meat racks through the chambers. Each chamber includes an internal diffuser panel which is intended to provide improved air distribution within the chamber. A heat exchanger assembly is mounted in each chamber above a fan. The fan moves air downwardly from the heat exchanger, through the diffuser panel, and then over the meat items hanging on the rack.

Unfortunately, the use of a trolley-type system to push product racks or cages through sequential smoking chambers or zones does not resolve the problems mentioned above. Such smoking processes are still slow, still require a relatively high level of product handling, and are therefore costly and inefficient. Additionally, due to the length and nature of the smoking process, the products produced therefrom tend to be very dark in color and can have an overpowering smoke flavor. Further, non-uniform temperature and smoke profiles within the chambers can result in substantial variations in the nature and quality of the products produced.

Continuous fired ovens and continuous indirectly heated ovens are known in the art. To our knowledge, no one has heretofore used such continuous ovens for simultaneously cooking and smoking food items.

An indirect heated, continuous impingement oven 2 of a type known in the art is depicted in FIG. 1. The oven comprises: a housing 4 including a base portion 6 and a liftable hood 8; a belt-type conveyor 10 for continuously conveying food items through the oven; a circulation system 12 for circulating a cooking medium (preferably air) through the oven; at least one burner 14 or other heating device for indirectly heating the cooking medium; and impingement headers 15 positioned above and below conveyor 10. Impingement headers 15 include a plurality of impingement nozzles, impingement orifices, and/or other such impingement structures 16. As will be understood by those skilled in the art, impingement devices 16 are operable for applying the cooking medium to the food items in an impinging manner.

Circulation system 12 will typically include at least one fan or other type of blower 17 which draws (recirculates) the cooking medium 13 from oven chamber 18 into blower inlet 19 and then delivers the cooking medium through impingement structures 16. Circulation system 12 will also typically include a heating element and/or heating chamber wherein burner 14 indirectly heats the cooking medium to a desired cooking temperature. Because the cooking medium is indirectly heated by burner 14, the combustion product produced by burner 14 (i.e., flames and combustion gases) does not contact either the cooking medium or the food products.

If allowed to contact food items such as poultry, combustion gases can act as curing agents and impart a raw, pink color to the meat. The end user of the product could therefore mistakenly believe that the product is not thoroughly cooked. For this and other reasons, indirect- fired ovens are generally preferred over direct-fired ovens for at least certain types of cooking operations.

Impingement structures 16 are positioned above, below, and across the width of conveyor 10 to thereby completely envelope the food items in a high velocity cooking atmosphere. Thus, each food item is properly cooked, regardless of its position on conveyor 10. Such uniformity minimizes overcooking and provides optimal yields. Conveyor 10 preferably utilizes a low density (highly porous) belt to ensure good air contact on the bottoms of the food items.

Continuous impingement oven 2 will also typically include: a steam system for humidifying the cooking atmosphere; systems for selecting and controlling temperatures, humidities and air velocities; means for adjusting nozzle height and conveyor height; a hoist for lifting oven hood 8; and a sealing system (e.g., a water seal) for sealing the sides of oven 2 when hood 8 is lowered onto base 6.

It is also typical that oven 2 be divided into a plurality of cooking zones and/or that a plurality of ovens 2 be operably linked together. When linked together in series, the ovens 2 will commonly employ a single conveyor 10 which extends through all of the ovens. A different set of cooking parameters can be employed in each individual zone and/or oven. In multizone systems, it is typical that a relatively high heat input be used in the first zone in order to bring the product up to cooking temperature. Less heat is needed in subsequent zones since the product need only be maintained at cooking temperature.

An indirect heated continuous spiral oven 22 of a type known in the art is depicted in FIG. 2. Spiral oven 22 comprises: an oven housing 24 having a cooking chamber 25; a spiral, belt-type conveyor system 26 for conveying food items through oven chamber 25; a circulation system 28 for circulating a cooking medium (preferably air) through chamber 25; and at least one burner or other heating device 30. Circulation system 28 includes at least one fan or other type of blower 31 and has a blower inlet 32. As with the heating device 14 used in impingement oven 2, heating device 30 is preferably operable for indirectly heating the cooking medium so that none of the heating medium/ combustion product produced by device 30 contacts either the cooking medium or the food items.

Circulation system 28 and heating device 30 operate in substantially the same manner as the circulation system 12 and heating device 14 of impingement oven 2 except that the spiral oven circulation system 28 typically does not include an impingement system. Rather, circulation system 28 delivers the heated cooking medium into cooking chamber 25 such that the cooking medium passively contacts and heats the food items conveyed on spiral conveyor 26. Spiral conveyor 26 will typically employ a dense belt (i.e., a belt which is either nonporous or has a low porosity) such that, when circulating system 28 delivers the hot cooking medium to the top of spiral conveyor 26, the cooking medium generally flows in a passive manner down the spiral belt (i.e., generally parallel to the belt) to the bottom of the oven.

Because spiral oven 22 employs a passive contacting system rather than an impingement system, the required cooking time in spiral oven 22 will typically be greater than the cooking time required in impingement oven 2. For poultry products, the cooking time in a continuous spiral oven 22 will typically be in the range of from about 40 minutes to about 1 hour as compared to a cooking time in a continuous impingement oven 2 in the range of from about 10 to about 25 minutes.

SUMMARY OF THE INVENTION

The present invention resolves the problems commonly encountered in prior art smoking systems and provides a uniform product which has a highly desirable smoked flavor and look, is desirably moist, and has a desirable texture and feel. The present invention is also much less labor intensive, much faster, much more efficient, and significantly less costly than prior art smokehouse systems.

In one aspect, the present invention provides an apparatus for smoking foods items, the apparatus comprising an oven and an adding means. The oven includes: (a) conveying means for continuously conveying the food items through the oven and (b) circulating means for circulating a cooking medium in the oven such that the cooking medium contacts and cooks the food items. The adding means is operable for adding smoke to the cooking medium such that the smoke contacts the food items along with the cooking medium.

In another aspect, the present invention provides an apparatus for smoking food items, wherein the apparatus comprises (a) contacting means for contacting the food items with smoke such that the smoke contacts the food items in an impinging manner and (b) delivering means for delivering the smoke to the contacting means.

In another aspect, the present invention provides an apparatus for cooking and smoking food items, wherein the apparatus comprises (a) contacting means for contacting food items with a cooking medium and with smoke such that the cooking medium and the smoke contact the food items in an impinging manner and (b) delivering means for delivering the cooking medium and the smoke to the contacting means.

In another aspect, the present invention provides an apparatus for cooking and smoking food items, wherein the apparatus comprises (a) a belt-type conveyor for continuously conveying the food items and (b) contacting means for contacting the food items with a cooking medium and with smoke as the food items are conveyed by the conveyor.

In another aspect, the present invention provides a method of smoking food items comprising the step of impinging smoke upon the food items. The present invention also provides an inventive product produced by this method.

In another aspect, the present invention provides a method of smoking food items comprising the steps of (a) continuously conveying the food items through an oven and (b) delivering smoke into the oven such that the smoke contacts the food items. The present invention also provides an inventive food product produced by this method.

In yet another aspect, the present invention provides a product produced by a method comprising the step of simultaneously cooking and smoking food items in an indirect-heated oven.

Further objects, features, and advantages of the present invention will be apparent upon examining the accompanying drawings and upon reading the following description of the preferred embodiments.

DESCRIPTION OF THE PREFERRED EMBODIMENT

Figure 3:
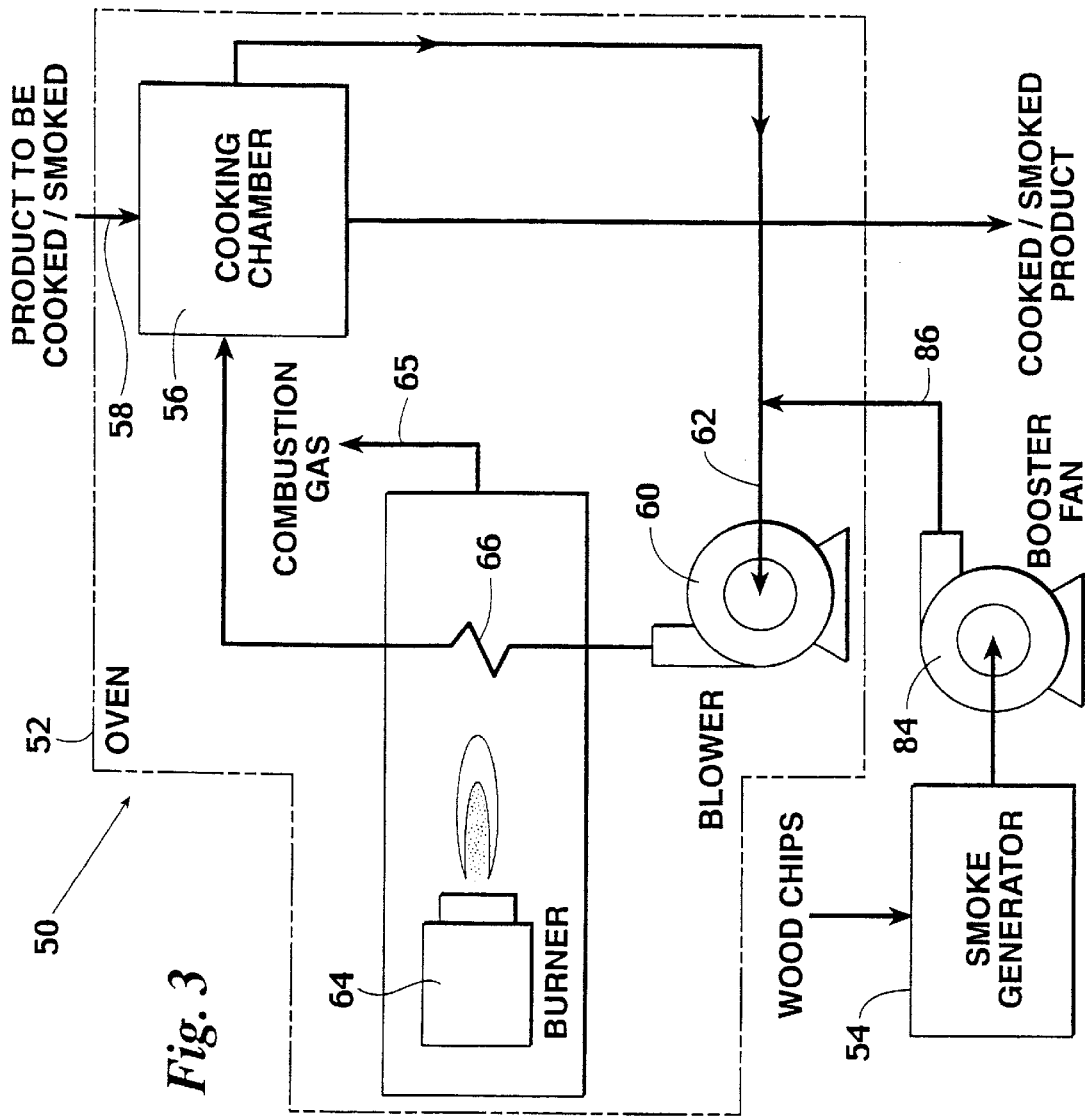
FIG. 3 provides a schematic diagram of an embodiment 50 of the cooking and smoking apparatus provided by the present invention.

A schematic diagram of an embodiment 50 of the inventive smoking and cooking apparatus is depicted in FIG. 3. Inventive apparatus 50 comprises a continuous oven 52 and a smoke generator 54. Oven 52 is preferably an indirect-fired oven and is also preferably either a continuous impingement oven 2 or a continuous spiral oven 22. Continuous oven 52 is most preferably an indirect-fired continuous impingement oven 2.

As indicated above, the presence of combustion gases in the cooking medium can have an undesirable effect on the look, moistness, taste, and feel of the cooked product. Moreover, smoke is much more efficiently and beneficently used in an indirect-fired oven than in a direct-fired oven. In a direct-fired oven, combination gas is continuously introduced into the cooking process, thus requiring a substantial amount of process gas to be continuously exhausted from the oven. This exhaust gas will carry a large amount of smoke out of the cooking system. In contrast, an indirect-fired oven provides a much more closed environment such that substantially all or most of the smoke which does not cling to the food items is recirculated through the oven.

Figure 1:
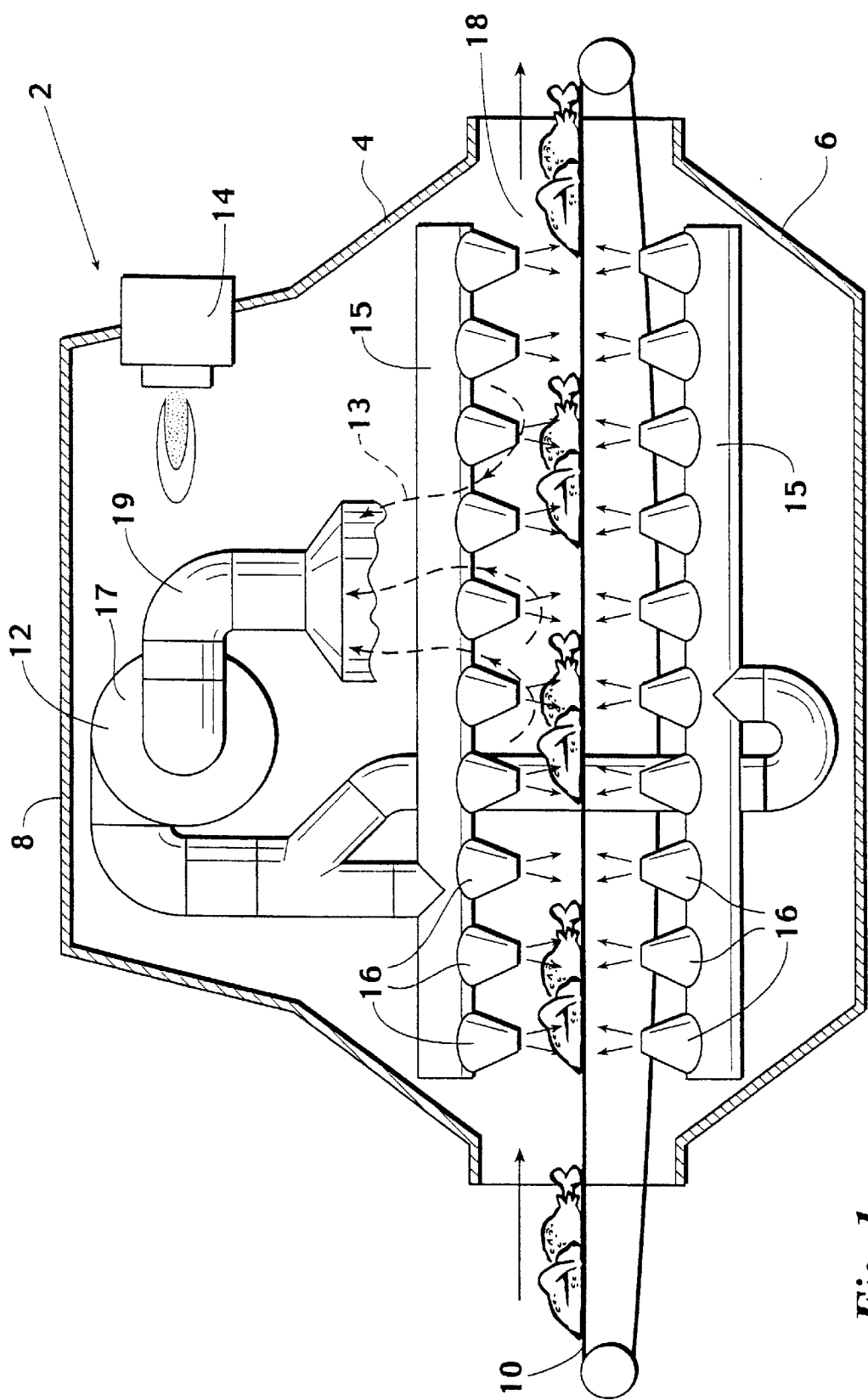
FIG. 1 provides a cutaway, schematic, elevational side view of a prior art, indirect-fired, continuous impingement oven 2.
Figure 2:
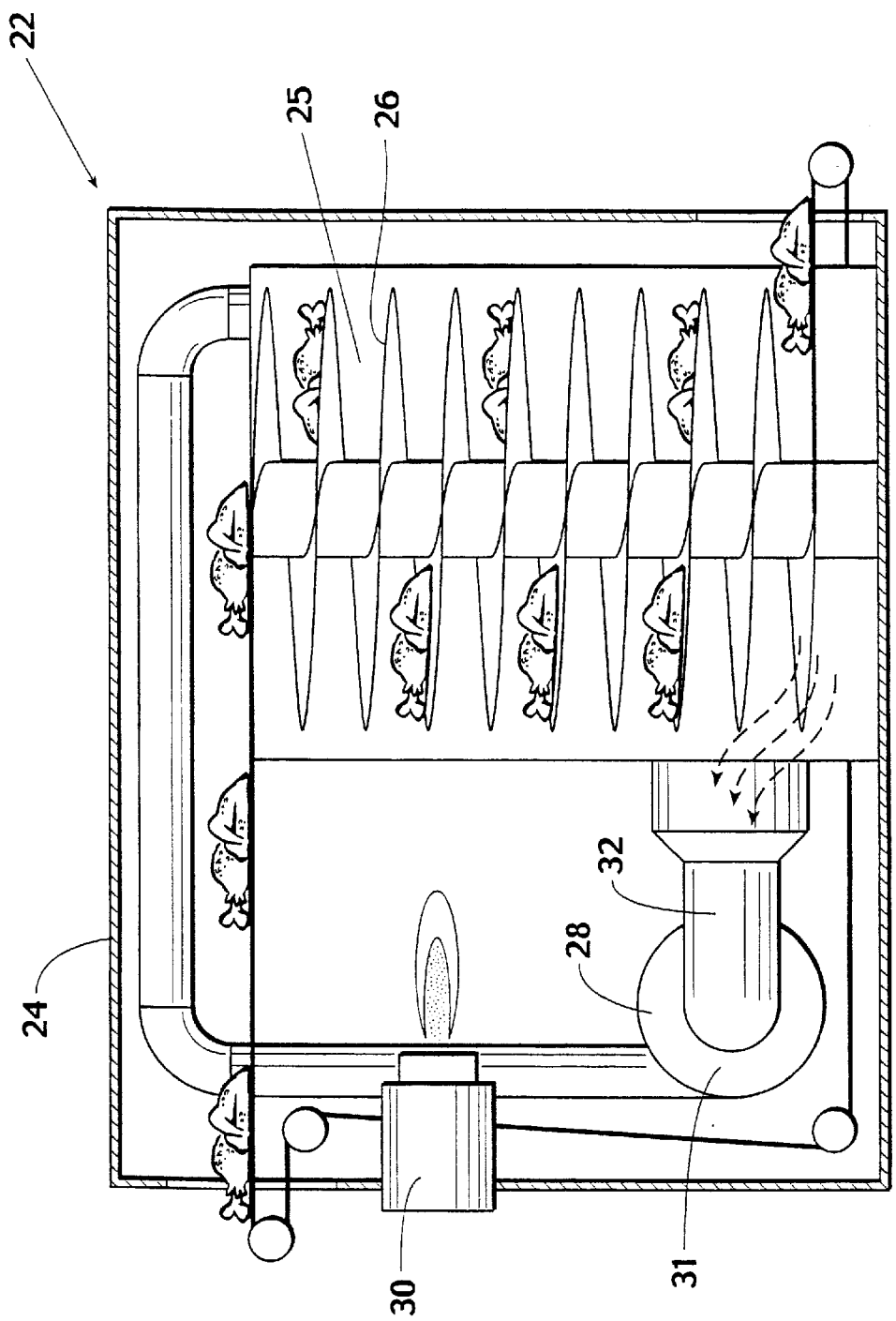
FIG. 2 provides a cutaway, schematic, elevational side view of a prior art, indirect-fired, continuous spiral oven 22.

In the same manner as continuous ovens 2 and 22 depicted in FIGS. 1 and 2, the continuous oven 52 used in inventive apparatus 50 preferably comprises: a cooking chamber 56; a conveyor (preferably a belt-type conveyor) 58 for continuously conveying food items through cooking chamber 56; a blower system (e.g, a fan system) 60 for circulating a cooking medium (preferably air) through cooking chamber 56; a blower inlet 62; a burner system 64 or other heating system; and a closed heating circuit 66 through which the cooking medium passes.

The flame, combustion gas, and/or other heating medium produced or used by heating system 64 heats the cooking medium as the cooking medium passes through closed circuit 66. However, the combustion products and/or other heating medium do not contact the cooking medium and do not enter into cooking chamber 56. Rather, if a burner system 64 is used, the combustion gas product 65 will typically be vented to the atmosphere. Thus, the combustion gas or other heating medium does not contact the food items being conveyed through cooking chamber 56.

Figure 4:
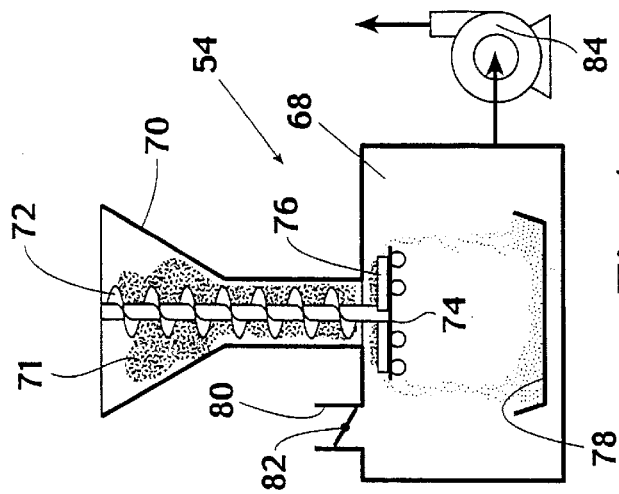
FIG. 4 provides a schematic, cutaway, elevational side view of a prior art smoke generating apparatus 54.

The smoke generator employed in inventive apparatus 50 can generally be any type of smoke generating system heretofore used in the art. An example of a suitable smoke generator 54 is depicted in FIG. 4. Smoke generator 54 comprises: a burning chamber 68; a funnel-type inlet 70 for feeding wood chips 71 into the top of chamber 68; an auger 72 extending through funnel 70 for pulling wood chips from the funnel into burning chamber 68; a burner plate 74, provided in chamber 68, upon which the wood chips are burned; a rotatable wiper 76 for pushing ashes off of burner plate 74; an ash pan 78 positioned in the bottom of burning chamber 68 for catching and holding the ashes which fall from burning plate 74; an air inlet 80 through which sufficient air enters burning chamber 68 to support the burning process; a damper 82 provided in inlet 80 for controlling air flow into burning chamber 68; and a blower 84 for pulling air into, and pulling smoke product out of, burning chamber 68.

As shown in FIG. 3, the smoke produced by generator 54 is delivered through conduit 86 from generator 54 to the inlet 62 of oven blower system 60. The oven blower system 60 will typically create a sufficient vacuum at blower inlet 62 to draw smoke from generator 54 into blower system 60. However, if necessary or desired, blower 84 can be used as a booster to assist in delivering smoke from generator 54 to blower inlet 62.

Upon delivery to blower inlet 62, the smoke from generator 54 mixes with the cooking medium and is blown through heating circuit 66 and into cooking chamber 56. As they travel through circuit 66, the smoke and cooking medium are indirectly heated by the heating system 64.

If the continuous oven 54 used in inventive smoking and cooking apparatus 50 is a spiral oven 22 of the type depicted in FIG. 2, the smoke and cooking medium flow in mixture through cooking chamber 25 and passively contact food items being conveyed on spiral conveyor 26. If a relatively dense, belt-type conveyor is used, the smoke and cooking medium will generally travel through cooking chamber 25 in a cross flow manner (i.e., in generally the same spiral direction as, and generally parallel to, the spiral conveyor belt 26.)

In one prototype of inventive apparatus 50 employing an indirect-fired, continuous spiral oven 22, poultry products (e.g., Cornish halves, whole chickens, and various individual chicken pieces) were successfully cooked and smoked at an oven temperature of approximately 300° F. using an oven cycle time of approximately 45 minutes.

If the continuous oven 52 employed in inventive apparatus 50 is an indirect-fired, continuous impingement oven 2 of the type depicted in FIG. 1, the smoke and cooking medium are blown in mixture through upper and lower impingement structures 16 such that the smoke and cooking medium contact the food items, carried by conveyor 10, in an impinging manner. As used herein and in the claims, the term "impingement" refers to flow, as through an impingement nozzle or other impingement device, which contacts the food items with sufficient force and velocity to significantly accelerate both the rate of the cooking process and the rate of the deposition of smoke particles on the product surface. The impinging flow is preferably directed at an angle of at least 45° with respect to the surface upon which the food items are conveyed.

A second prototype of inventive apparatus 50 employing an indirect-fired, continuous impingement oven 2 was used to cook and smoke Cornish halves, whole chickens, and various chicken pieces. The products were successfully cooked and smoked in the prototype at temperatures in the range of from about 325–350° F. using oven cycle times of from only about 13 to about 22 minutes.

In order to promote the adhesion of smoke particles to the food items conveyed through continuous oven 52, it is preferred that the surfaces of the food items be substantially free of condensation and other moisture. Thus, it will typically be preferred that very little, if any, steam be added to the cooking chamber environment. Further, to add additional flavor and internal moisture to the inventive product, the food items can be injected with a marinade solution (e.g., a phosphate and saltwater marinade) prior to being conveyed through continuous oven 52. Marinated products also typically have a more desirable color than do nonmarinated products.

The continuous oven 52 employed in inventive apparatus 50 can also comprise a plurality of cooking zones and/or a plurality of oven units (e.g., a series of continuous impingement ovens 2). As indicated above, a series of cooking zones and/or ovens can be employed to create optimum cooking conditions. The amount of smoke added to the individual zones and/or ovens can also be varied, as necessary, to optimize the smoking characteristics of the inventive apparatus.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. A method of smoking food items comprising the steps of:
   (a) continuously conveying said food items such that said food items pass directly beneath a plurality of upper impingement structures and directly above a plurality of lower impingement structures; and
   (b) while conveying said food items, smoking said food items by blowing smoke directly from said upper and said lower impingement structures onto said food items.

2. The method of claim 1 wherein said upper impingement structures are impingement nozzles and said lower impingement structures are impingement nozzles.

3. The method of claim 2 wherein:
   said smoke is blown downward onto said food items by said upper impingement nozzles at an angle in the range of from 45° to 90° from horizontal and
   said smoke is blown upward onto said food items by said lower impingement nozzles at an angle in the range of from 45° to 90° from horizontal.

4. The method of claim 2 wherein:
   said food items are conveyed on a conveyor belt having a width;
   said upper impingement nozzles extend across said width; and
   said lower impingement nozzles extend across said width.

5. The method of claim 1 wherein said smoke is blown directly onto said food items in step (b) at a velocity effective for continuously smoking whole chickens in less than one hour.

6. The method of claim 1 wherein said smoke is blown directly onto said food items in step (b) at a velocity effective for continuously smoking whole chickens in less than 25 minutes.

* * * * *